(12) United States Patent
Kishi et al.

(10) Patent No.: US 10,020,539 B2
(45) Date of Patent: Jul. 10, 2018

(54) NONAQUEOUS ELECTROLYTE SECONDARY BATTERY AND BATTERY PACK

(71) Applicant: Kabushiki Kaisha Toshiba, Minato-ku (JP)

(72) Inventors: Takashi Kishi, Yokosuka (JP); Wen Zhang, Sagamihara (JP); Miho Maruyama, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/124,011

(22) PCT Filed: Mar. 14, 2014

(86) PCT No.: PCT/JP2014/056892
§ 371 (c)(1),
(2) Date: Sep. 6, 2016

(87) PCT Pub. No.: WO2015/136688
PCT Pub. Date: Sep. 17, 2015

(65) Prior Publication Data
US 2017/0018807 A1    Jan. 19, 2017

(51) Int. Cl.
*H01M 10/0569*  (2010.01)
*H01M 10/0525*  (2010.01)
(Continued)

(52) U.S. Cl.
CPC ....... *H01M 10/0569* (2013.01); *H01M 4/131* (2013.01); *H01M 4/505* (2013.01);
(Continued)

(58) Field of Classification Search
CPC ........ H01M 2/36; H01M 4/131; H01M 4/505; H01M 4/525; H01M 10/0525;
(Continued)

(56) References Cited

U.S. PATENT DOCUMENTS

2001/0008730 A1  7/2001  Amine et al.
2006/0003232 A1  1/2006  Jung et al.
(Continued)

FOREIGN PATENT DOCUMENTS

EP   2 166 611 A1   3/2010
JP   2000-515672 A   11/2000
(Continued)

OTHER PUBLICATIONS

International Search Report dated Jun. 10, 2014 in PCT/JP2014/056892.
(Continued)

*Primary Examiner* — Brittany Raymond
(74) *Attorney, Agent, or Firm* — Oblon, McClelland, Maier & Neustadt, L.L.P.

(57) ABSTRACT

A nonaqueous electrolyte solution secondary battery of the embodiment includes an exterior material, a nonaqueous electrolyte solution, a positive electrode, a negative electrode and a separator sandwiched between the positive electrode and the negative electrode. The nonaqueous electrolyte solution is charged in the exterior material. The nonaqueous electrolyte solution contains at least one of sulfone-based compounds represented by formula 1, a partially fluorinated ether represented by a molecular formula of formula 2, and at least one of lithium salts. The positive electrode is housed in the exterior material. The positive electrode contains a composite oxide represented by $Li_{1-x}Mn_{1.5-y}Ni_{0.5-z}M_{y+z}O_4$ as a positive electrode active material (wherein $0 \leq x \leq 1$, $0 \leq (y+z) \leq 0.15$, and M represents one, or two or more selected from Mg, Al, Ti, Fe, Co, Ni, Cu, Zn, Ga, Nb, Sn, Zr and Ta). The negative electrode is housed in the exterior material.

16 Claims, 7 Drawing Sheets

(51) Int. Cl.
*H01M 10/0568* (2010.01)
*H01M 4/131* (2010.01)
*H01M 4/505* (2010.01)
*H01M 4/525* (2010.01)
*H01M 10/0567* (2010.01)
*H01M 2/36* (2006.01)
*H01M 10/058* (2010.01)

(52) U.S. Cl.
CPC ....... *H01M 4/525* (2013.01); *H01M 10/0525* (2013.01); *H01M 10/0567* (2013.01); *H01M 10/0568* (2013.01); *H01M 2/36* (2013.01); *H01M 10/058* (2013.01); *H01M 2220/20* (2013.01)

(58) Field of Classification Search
CPC ......... H01M 10/0567; H01M 10/0568; H01M 10/0569; H01M 10/058; H01M 2220/20; H01M 2300/0028; H01M 2300/0034
See application file for complete search history.

(56) References Cited

U.S. PATENT DOCUMENTS

| | | |
|---|---|---|
| 2006/0046155 A1 | 3/2006 | Inagaki et al. |
| 2007/0224516 A1 | 9/2007 | Deguchi et al. |
| 2011/0020700 A1 | 1/2011 | Iwaya |
| 2012/0058379 A1* | 3/2012 | Kishi .................. H01M 4/485 429/149 |
| 2012/0308881 A1* | 12/2012 | Tokuda ............. H01M 10/0567 429/199 |
| 2013/0071731 A1 | 3/2013 | Tokuda et al. |
| 2013/0078530 A1 | 3/2013 | Kishi et al. |
| 2013/0101904 A1 | 4/2013 | Onozaki et al. |
| 2014/0134501 A1* | 5/2014 | Li ....................... H01M 10/052 429/339 |
| 2014/0227562 A1* | 8/2014 | Kamizori ............ H01M 10/052 429/7 |
| 2015/0086876 A1 | 3/2015 | Taeda et al. |

FOREIGN PATENT DOCUMENTS

| | | |
|---|---|---|
| JP | 2006-19274 A | 1/2006 |
| JP | 2007-287677 A | 11/2007 |
| JP | 2008-269982 A | 11/2008 |
| JP | 4245532 B2 | 3/2009 |
| JP | WO 2009/133899 A1 | 9/2011 |
| JP | 2012-59457 A | 3/2012 |
| JP | 2013-38072 A | 2/2013 |
| JP | 2013-69638 A | 4/2013 |
| JP | 2014-41847 A | 3/2014 |
| JP | 2014-72102 A | 4/2014 |
| WO | WO 2011/136226 A1 | 11/2011 |
| WO | WO 2011/149072 A1 | 12/2011 |
| WO | WO 2013/157504 A1 | 10/2013 |
| WO | WO 2013/183655 A1 | 12/2013 |

OTHER PUBLICATIONS

A. Abouimrane, et al., "Sulfone-based electrolytes for high-voltage Li-ion batteries" Electrochemistry Communications, vol. 11, 2009, pp. 1073-1076.

Kang Xu, et al., "Sulfone-Based Electrolytes for Lithium-Ion Batteries" Journal of the Electrochemical Society, vol. 149, No. 7, 2002, pp. A920-A926.

\* cited by examiner

NONAQUEOUS ELECTROLYTE SECONDARY BATTERY AND BATTERY PACK

FIELD

Embodiments described herein relate generally to a nonaqueous electrolyte secondary battery and a battery pack.

BACKGROUND

A secondary battery is contributing to reduction of waste compared to a primary battery because it is possible to use a secondary battery while repeating charge and discharge many times. Also, a secondary battery is widely used as a power source for a portable device which cannot be connected to an AC power source and a backup power source when an AC power source is disconnected or stopped. In recent years, the expansion of application range of a secondary battery has been studied as exemplifying a vehicle application, a backup power source application such as a solar cell, and a power leveling application in a solar cell, etc. This expansion increases the demand for the improvement of performances such as capacity, temperature characteristics and safety in a secondary battery further and further.

Among secondary batteries, a nonaqueous electrolyte solution secondary battery is a secondary battery which performs charge and discharge through the movement of lithium ion between positive and negative electrodes. Because an organic solvent is used as an electrolyte solution, it is possible to obtain the larger voltage than a Ni—Cd secondary battery or a nickel hydrogen secondary battery using an aqueous solution as an electrolyte solution. Currently, in a commercially available nonaqueous electrolyte solution secondary battery, a lithium-containing cobalt composite oxide or lithium-containing nickel composite oxide is used as a positive electrode active material, a carbon-based material or lithium titanate, etc. is used as a negative electrode active material, and a solution prepared by dissolving a lithium salt such as $LiPF_6$ or $LiBF_4$ in an organic solvent such as a cyclic carbonate or a linear carbonate is used as an electrolyte solution.

The average operating potential of a positive electrode active material is approximately within a range of 3.4 to 3.8 V with respect to a lithium metal potential, and the maximum peak potential thereof during charge is approximately within a range of 4.1 to 4.3 V. On the other hand, the average operating potential of a carbon-based material which is a negative electrode active material is approximately within a range of 0.05 to 0.5 V with respect to a lithium metal potential, and the average operating potential of lithium titanate is approximately 1.55 V. By combining these positive and negative electrode materials, the battery voltage falls within a range of 2.2 to 3.8 V, and the maximum charge voltage falls within a range of 2.7 to 4.3 V.

One of the proposed methods of further improving a capacity is a method of using $LiMn_{1.5}Ni_{0.5}O_4$ in which the maximum peak potential during charge is within a range of 4.4 to 5.0 V. However, when using a carbonate-based solvent which has been conventionally used, a carbonate-based solvent causes an oxidation reaction at a positive electrode during charge, which can results in the deterioration of battery performance and gas generation.

By contrast, another proposed method is a method of using sultone or a sulfone-based compound as a solvent. However, there were several problems that sultone or a sulfone-based compound has a high viscosity, a low solubility to a lithium salt, and a high reactivity to a negative electrode as compared with a conventional solvent. In addition, when using sultone or a sulfone-based compound as a solvent, the initial charge and discharge efficiency and the gas generation amount are poorer than those of the currently used nonaqueous electrolyte solution secondary batteries, and further improvement is required.

Sultone and a sulfone-based solvent have a high viscosity and a high dielectric constant. When an electrolyte solution is prepared by dissolving a lithium salt, the ion conductivity decreases compared with an electrolyte solution prepared by using a conventional carbonate-based solution. Also, sultone and a sulfone-based solvent have a poor impregnation property to an electrode as compared with a conventional carbonate-based solvent. For this reason, there was also the problem that the nonaqueous electrolyte solution battery produced by using sultone or a sulfone-based solvent has poor output characteristics and cycle performance as compared with a nonaqueous electrolyte solution battery produced by using a conventional carbonate-based solvent. By contrast, the electrolyte solution prepared by mixing sultone or a sulfone-based solvent with a carbonate-based solvent has been proposed. However, a carbonate-based solvent tends to be preferentially oxidized, and unignorable gas generation can occur at an enough mixing amount to obtain the sufficient decrease in viscosity.

DETAILED DESCRIPTION

Hereinafter, the nonaqueous electrolyte solution secondary battery of the embodiment is described.

The nonaqueous electrolyte solution secondary battery of the embodiment includes an exterior material, a nonaqueous electrolyte solution, a positive electrode, a negative electrode and a separator sandwiched between the positive electrode and the negative electrode. The nonaqueous electrolyte solution is charged in the exterior material. The nonaqueous electrolyte solution contains at least one of sulfone-based compounds represented by the following formula 1, a partially fluorinated ether represented by the molecular formula of the following formula 2, and at least one of lithium salts. The positive electrode is housed in the exterior material. The positive electrode contains a composite oxide represented by $L_{1-x}M_{1.5-y}Ni_{0.5-z}M_{y+z}O_4$ as a positive electrode active material (wherein $0 \leq x \leq 1$, $0 \leq (y+z) \leq 0.15$, and M represents one, or two or more selected from Mg, Al, Ti, Fe, Co, Ni, Cu, Zn, Ga, Nb, Sn, Zr and Ta). The negative electrode is housed in the exterior material. The negative electrode contains a Ti-containing oxide capable of inserting and extracting lithium as a negative electrode active material. In the following formula 1, $R_1$ and $R_2$ represent an alkyl group having 1 to 6 carbon atoms. In the following formula 2, x and y represent an integer of $x>3$ and $y>3$.

FORMULA 1

FORMULA 2

The battery pack of another embodiment includes the nonaqueous electrolyte solution secondary battery according to the aforementioned embodiment.

The nonaqueous electrolyte solution secondary battery of the present embodiment includes an exterior material, a nonaqueous electrolyte solution, a positive electrode, a negative electrode and a separator sandwiched between the positive electrode and the negative electrode.

The nonaqueous electrolyte solution contains a sulfone-based compound, a partially fluorinated ether, and at least one of lithium salts, and is charged in the exterior material.

The positive electrode contains a composite oxide represented by $L_{1-x}Mn_{1.5-y}Ni_{0.5-z}M_{y+z}O_4$ as a positive electrode active material (wherein $0 \leq x \leq 1$, $0 \leq (y+z) \leq 0.15$, and M represents one, or two or more selected from Mg, Al, Ti, Fe, Co, Ni, Cu, Zn, Ga, Nb, Sn, Zr and Ta), and is housed in the exterior material.

The negative electrode contains a Ti-containing oxide capable of inserting and extracting lithium as a negative electrode active material, and is housed in the exterior material.

Hereinafter, the nonaqueous electrolyte solution according to the present embodiment is described.

The nonaqueous electrolyte solution contains at least one of the sulfone-based compounds represented by the following formula 3, the partially fluorinated ether represented by the molecular formula of the following formula 4, and at least one of lithium salts. In the following formula 3, $R_1$ and $R_2$ represent an alkyl group having 1 to 6 carbon atoms. Also, in the following formula 4, x and y represent an integer of $x>3$ and $y>3$.

FORMULA 3

FORMULA 4

Also, in the partially fluorinated ether represented by the aforementioned formula (4), it is preferable that the ratio (F/H) of a fluorine atom number (F) and a hydrogen atom number (H) be 1.0 or more and 3.0 or less.

Moreover, in the aforementioned formula (4), x, which represents the carbon atom number of the partially fluorinated ether, is 8 or more and 12 or less.

Because the nonaqueous electrolyte solution includes the aforementioned nonaqueous electrolyte solution, it is possible to obtain the nonaqueous electrolyte solution having high cycle performance while sufficiently suppressing the reaction of the nonaqueous electrolyte solution and the positive electrode the potential of which increases with respect to the potential of a lithium metal during charge. Particularly, in the positive electrode according to the present embodiment, the peak voltage during charge is within a range of 4.6 to 4.8 V vs. Li/L$^+$ as described below, and this range is relatively high. By using the combination of this positive electrode and the nonaqueous electrolyte solution according to the present embodiment, it is possible to obtain the effect of suppressing side reactions on the positive electrode in a high potential state.

Also, by mixing the partially fluorinated ether having low viscosity with the sulfone-based compound, the impregnation property of the nonaqueous electrolyte solution for the positive electrode is improved, and the interface resistance between the positive electrode and the nonaqueous electrolyte solution decreases. In addition, the re-impregnation property is improved in the movement of the nonaqueous electrolyte solution accompanying with charge and discharge.

The partially fluorinated ether according to the present embodiment has the oxidation resistance improved by fluorination while maintaining the high impregnation property for the positive electrode and the low viscosity that is a feature of ether itself. A perfluoroether obtained by fluorinating all hydrogens of an alkyl ether has chemical stability and good permeability, and thus is widely used as a detergent, etc. However, a perfluoroether and sulfone-based compound are not soluble with each other so as to make a single mixture, and thus, a mixed solvent obtained by mixing a perfluoroether and the sulfone-based compound cannot be used as the nonaqueous electrolytic solution. Therefore, in the present embodiment, 3 or more of fluorine atoms are introduced in a molecule of an ether, to thereby carry out partial fluorination. For this reason, it becomes possible to achieve both of oxidation resistance and the compatibility with the sulfone-based compound, and to use a perfluoroether as the electrolyte solution for the nonaqueous electrolyte solution secondary battery.

The sulfone-based compound is a sulfone-based solvent in which $R_1$ and $R_2$ represents an alkyl group having 6 or less carbon atoms in the aforementioned formula 3. $R_1$ and $R_2$ represent an alkyl group having 6 or less such as a methyl group, an ethyl group, a butyl group or an isopropyl group. An alkyl group can be a linear alkyl group or a branched alkyl group. Because it is preferable that the sulfone-based compound have a low melting point, it is preferable that the sulfone-based compound contain an asymmetric sulfone compound in which $R_1$ and $R_2$ represent different alkyl groups from each other. Preferable examples of the sulfone-based compound include isopropyl methyl sulfone (abbreviation: IPMS) in which $R_1$ represents a methyl group and $R_2$ represents an isopropyl, and ethyl isopropyl sulfone (abbreviation: EIPS) in which $R_1$ represents an ethyl group and $R_2$ represents an isopropyl group. IPMS and EIPS are preferable because having such a low melting point as to be liquid at room temperature and excellent solubility for a lithium salt. Other examples such as n-butyl-n-propyl sulfone and ethyl n-propyl sulfone are preferable because having a low melting point. Another preferable example is a sulfone-based compound in which $R_1$ and $R_2$ represent an alkyl group having 4 or less carbon atoms in terms of a melting point.

The partially fluorinated ether according to the present embodiment is represented by the molecular formula of the aforementioned formula 4. When the ratio (F/H) of a fluorine atom number (F) and a hydrogen atom number (H) in one molecule of the partially fluorinated ether is 1.0 or more and 3.0 or less, it is possible to achieve both of oxidation resistance due to fluorine atoms and the compatibility with the sulfone solvent due to hydrogen atoms. In addition, it is more preferable that the ratio (F/H) be 1.5 or more and 2.5 or less because the balance between oxidation resistance and the compatibility is more improved. Particularly when the carbon number is 8 or more, a fluorine atom-containing alkyl chain is sufficiently elongated. For this reason, it is possible to improve the compatibility and to avoid the reduction in a boiling point caused by a too low molecular weight. When the carbon number is 12 or less, it is possible to suppress the increase in viscosity accompanying with the increase in a molecular weight.

Also, it is preferable that the fluorine atoms in the molecule of the partially fluorinated ether not be unevenly distributed on one side of an ether bond but be distributed on both sides.

Specific examples of the partially fluorinated ether include 1,1,1,2,3,3-hexafluoro-4-(1,1,2,3,3,3-hexafluoropropoxy)-pentane (molecular formula: $C_8H_6F_{12}O$), the partially fluorinated ether having the molecular formula of $C_9H_{10}F_{10}O$, the partially fluorinated ether having the molecular formula of $C_7H_4F_{12}O$.

The mixing ratio of the sulfone-based compound and the partially fluorinated ether is arbitrary as long as a homogeneous liquid can be prepared. In order to obtain sufficient dielectric constant to dissolve a lithium ion, it is preferable that the volume ratio of the sulfone-based compound:the partially fluorinated ether be 2:1 to 98:2. In terms of the balance between dielectric constant and the viscosity reduction due to ether, it is more preferable that the volume ratio be within a range of 3:1 to 95:5. The structure and composition of the sulfone-based compound and the partially fluorinated ether can be analyzed by liquid chromatography and gas chromatography, etc.

It is preferable that the lithium salt be any one or a mixture of $LiPF_6$ and $LiBF_4$. $LiPF_6$ and $LiBF_4$ have high oxidation resistance, and by using these lithium salts as a solute of the nonaqueous electrolyte, it is possible to suppress the decomposition reaction on the positive electrode and to obtain high charge and discharge efficiency. Also, these lithium salts are commonly used in the nonaqueous liquid electrolyte solution secondary battery which is practically used and in which the maximum charge voltage of the positive electrode is 4.3 V, and thus, there is the advantage in that highly pure products are easily available.

It is preferable that the concentration of the lithium salt in the nonaqueous electrolyte solution be within a range of 0.5 mol/L or more 2.5 mol/L or less.

Next, the positive electrode is described.

The positive electrode according to the present embodiment contains the composite oxide represented by $Li_{1-x}Mn_{1.5-y}Ni_{0.5-z}M_{y+z}O_4$ as a positive electrode active material, in which $0 \leq x \leq 1$, $0 \leq y$, $0 \leq z$, $0 \leq (y+z) \leq 0.15$, and M represents one, or two or more selected from Mg, Al, Ti, Fe, Co, Ni, Cu, Zn, Ga, Nb, Sn, Zr and Ta. Because of the composite oxide, it is possible to obtain high open-circuit voltage and high charge capacity. Also, it is possible to sufficiently suppress the reaction of the positive electrode and the nonaqueous electrolyte solution containing a mixed solvent made of the sulfone-based compound and the partially fluorinated ether. In terms of cycle performance and cost, it is preferable that the positive electrode active material be $LiMn_{1.5}Ni_{0.5}O_4$.

Also, by substituting a part of Mn or Ni by Mg, Al, Ti, Fe, Co, Ni, Cu, Zn, Ga, Nb, Sn, Zr or Ta, it is possible to reduce the surface activity of the positive electrode active material and to well suppress the increase in battery resistance. Particularly, the substitution with Mg or Zr is more preferable in terms of large effects. It is preferable that the substitution amount (y+z) be set to 0.01 or more in terms of the suppression of surface activity, and it is preferable that the substitution amount (y+z) be set to 0.15 or less in terms of the increase in capacity. The particularly preferable range of the substitution amount is 0.03 or more and 0.1 or less.

Next, the negative electrode is described.

It is preferable that the negative electrode according to the present embodiment be the electrode in which the minimum peak potential during charge is 1.0 V or more vs. $Li/Li^+$ because side reactions with the sulfone-based compound is suppressed. By limiting the minimum peak potential during charge of the negative electrode within a range of 1.0 V or more and 1.5 V or less, it is possible to minimally suppress side reactions involving the nonaqueous electrolyte solution being combined with the positive electrode, and to achieve high charge and discharge efficiency and cycle performance. In particular, it is more preferable to limit the minimum peak potential during charge of the negative electrode within a range of 1.35 V or more and 1.45 V or less vs. $Li/Li^+$ because it is possible to further reduce the deterioration of the negative electrode active material in cycles, and to suppress the increase in impedance. Also, it is more preferable to limit the maximum peak potential during discharge within a range of 1.6 V or more and 2.0 V or less vs. $Li/Li^+$ because it is possible to further reduce the deterioration of the negative electrode active material in charge/discharge cycles.

Examples of the negative electrode active material that operates at the aforementioned potential include spinel type lithium titanate, monoclinic titanium dioxide, monoclinic niobium-titanium composite oxide and iron sulfide. In particular, by using spinel type lithium titanate or monoclinic titanium dioxide, it is possible to improve the flatness of a charge and discharge curve. Also, it is easy to control the potential between the positive and negative electrodes when the negative electrode is combined with the positive electrode. Also, it is possible to minimally suppress variations due to the proceeding of cycles and to achieve high cycle performance.

Specifically, the negative electrode active material includes a lithium titanium oxide. Examples of a lithium titanium oxide include the spinel-structure lithium titanium oxide represented by $Li_{4/3+x}Ti_{5/3}O_4$ ($0 \leq x \leq 1$); the bronze-structure (B) or anatase-structure titanium oxide represented by $Li_xTiO_2$ ($0 \leq x \leq 1$) (the composition before being charged is $TiO_2$); and the niobium titanium oxide represented by $Li_xNb_aTiO_7$ ($0 \leq x$, more preferably $0 \leq x \leq 1$, and $1 \leq a \leq 4$). Also, examples of a lithium titanium oxide include ramsdellite-structure $Li_{2+x}Ti_3O_7$ (0≤x≤1), $Li_{1+x}Ti_2O_4$ (0≤x≤1), $Li_{1.1+x}Ti_{1.8}O_4$ (0≤x≤1) and $Li_{1.07+x}Ti_{1.86}O_4$ (0≤x≤1). Preferable examples of the titanium oxide represented by $Li_xTiO_2$ include the anatase-structure $TiO_2$ and the bronze-structure $TiO_2$ (B), and the low-crystalline titanium oxide obtained by the thermal treatment at 300° C. to 600° C. is also preferable. As another titanium oxide, it is possible to use lithium titanium oxide in which some of Ti has been substituted by at least one element selected from the group consisting of Nb, Mo, W, P, V, Sn, Cu, Ni and Fe.

It is preferable to set the average particle diameter of the primary particle of the negative electrode active material within a range of 0.001 μm or more and 1 μm or less. Also, even when the particle shape is any form of a granular shape and a fibrous shape, it is possible to good performance. When the particle shape is fibrous, it is preferable that a fiber diameter is 0.1 μm or less.

In the negative electrode active material, it is preferable that the average particle diameter thereof be 1 μm or less and that the specific surface area obtained by the BET method using $N_2$ adsorption be within a range of 3 to 200 m²/g. By setting so, it is possible to further improve the affinity of the negative electrode to the nonaqueous electrolyte solution.

It is possible to set the specific surface area of the negative electrode material layer (except for the current collector) obtained by the BET method within a range of 3 m²/g or more and 50 m²/g or less. The more preferable range of the specific surface area is 5 m²/g or more and 50 m²/g or less.

It is preferable to set the porosity of the negative electrode (except for the current collector) within a range of 20% to 50%. By setting so, it is possible to obtain the negative electrode having high density and the affinity to the nonaqueous electrolyte solution. The more preferable range of the porosity is 25% to 40%.

As the negative electrode, it is preferable to use the electrode in which the maximum peak potential during charge is 4.06 V or more and 4.8 or less vs. Li/Li⁺ and the minimum peak potential during discharge is 4.0 V or more and 4.3 or less vs. Li/Li⁺. Also, as described above, it is preferable that the minimum peak potential of the negative electrode during charge is set to 1.35 V or more and 1.45 or less vs. Li/Li⁺ and that the maximum peak potential during discharge is 1.6 V or more and 2.0 or less vs. Li/Li⁺. By regulating the operating potentials of the positive electrode and the negative electrode, it is possible to suppress side reactions caused by impurities or the sulfone-based compound contained in the positive electrode and the negative electrode and to obtain a high charge and discharge efficiency and good cycle performance.

The nonaqueous electrolyte solution secondary battery described above includes the nonaqueous electrolyte solution which contains the sulfone-based compound, the partially fluorinated ether and the lithium salt; the positive electrode which contains $Li_{1-x}Mn_{1.5-y}Ni_{0.5-z}M_{y+z}O_4$ as the positive electrode active material; the negative electrode which contains the Ti-containing oxide capable of inserting and extracting lithium as the negative electrode active material; and the separator; and the exterior material. Therefore, it is possible to suppress the reaction between the nonaqueous electrolyte solution and the positive electrode and to improve cycle performance.

First Embodiment

Hereinafter, a specific example of the nonaqueous electrolyte solution secondary battery according to the present embodiment is described. In the following description, an example of the nonaqueous electrolyte solution secondary battery of the laminate exterior housing the stacked electrode group is described with reference to FIG. 1A and FIG. 1B. The form and the exterior material of the electrode group of the nonaqueous electrolyte solution secondary battery are not limited to the following examples, and it is possible to use a wound-type electrode group and a metal exterior material.

Figure 1A:
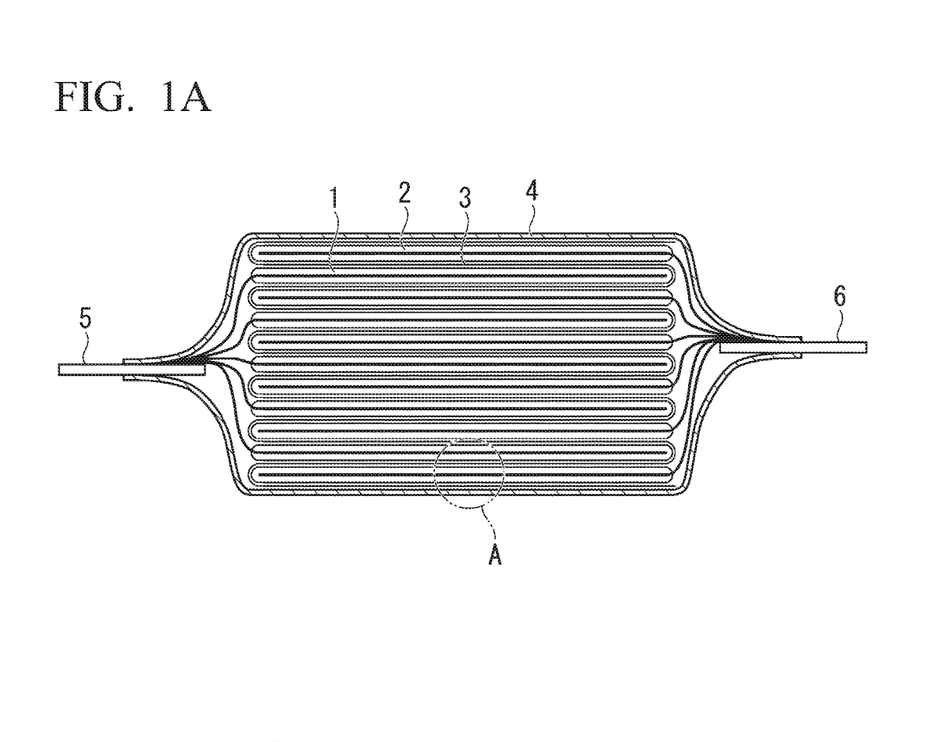
FIG. 1A is a schematic cross-sectional view showing the nonaqueous electrolyte solution secondary battery of the 1st embodiment.
Figure 1B:
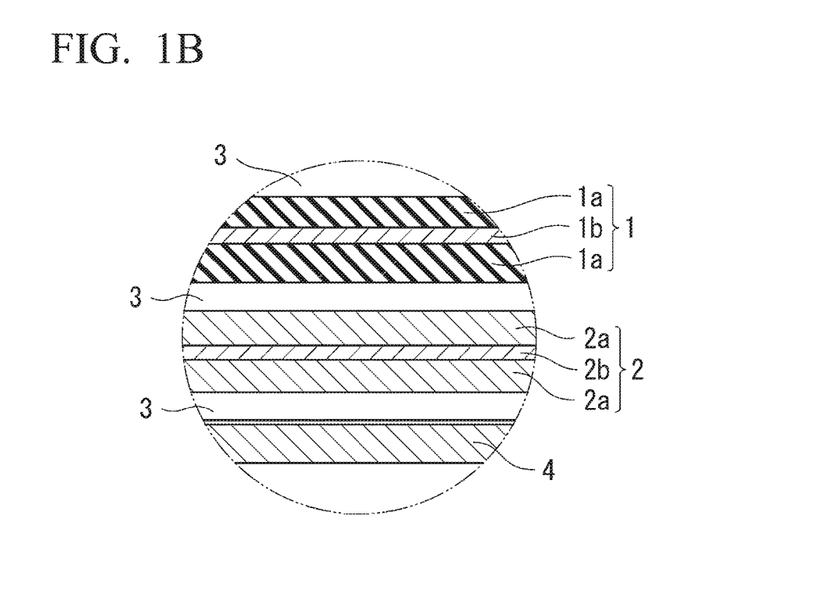
FIG. 1B is an enlarged schematic cross-sectional view of the A part of FIG. 1A.

As shown in FIG. 1A and FIG. 1B, the nonaqueous electrolyte solution secondary battery of the present embodiment is comprised of the electrode group in which the positive electrode 1 connected to the positive electrode terminal 5, the negative electrode 2 connected to the negative electrode terminal 6, and the separator 3 are laminated in a switchback form; the nonaqueous electrolyte solution which impregnates the electrode group; and the exterior container 4 which houses the nonaqueous electrolyte solution and the electrode group. The exterior container 4 is formed from the exterior material. The positive electrode 1 has the positive electrode active material layers 1a on one side or both sides of the positive electrode current collector 1b. In the same manner, the negative electrode 2 has the negative electrode active material layers 2a on one side or both sides of the negative electrode current collector 2b.

The positive electrode 1 includes the positive electrode active material described above, and also can include the binder and the electroconductive agent having electroconductivity such as carbon. The positive electrode active material layer 1a formed by mixing the positive electrode active material, the electroconductive agent and the binder is formed on one surface or both surfaces of the positive electrode current collector 1b. Also, in the positive electrode 1, it is possible to use the positive electrode current collector 1b formed from a base material such as an electroconductive metal.

The electroconductive agent improves the current collection performance of the positive electrode active material and reduces contact resistance between the positive electrode active material and the positive electrode current collector 1b. Examples of the electroconductive agent include an agent containing acetylene black, carbon black, artificial graphite, natural graphite, or an electroconductive polymer.

The binder binds the positive electrode active material to the electroconductive agent, and binds the positive electrode active material layer 1a to the positive electrode current collector 1b. As the binder, it is possible to use polytetrafluoroethylene (PTFE), polyvinylidene fluoride (PVdF), an ethylene-propylene-diene copolymer and styrene-butadiene rubber (SBR).

As the positive electrode current collector 1b, it is possible to use metal foils, thin plates, meshes and wire meshes, etc. of aluminum, stainless steel and titanium, etc.

As a form of the positive electrode 1, the sheet-shaped positive electrode is exemplified. In order to prepare this form, the binder is added in the positive electrode active material and the conductive agent, and the mixture is kneaded and rolled to thereby form a sheet. Also, as another form of the positive electrode 1, the following positive electrode is exemplified. First, the positive electrode active material, the electroconductive agent and the binder are suspended in a solvent such as toluene or N-methylpyrrolidone, to thereby form the slurry. Then, this slurry is applied onto the positive electrode current collector 1b, and dried to thereby produce the positive electrode in which the sheet-shaped positive electrode active material layer 1a is formed on the positive electrode current collector 1b.

In the positive electrode active material-containing layer, it is preferable that the active material, the electroconductive agent, and the binding agent be mixed at ratios of 80 mass % or more and 95 mass % or less, 3 mass % or more and 18 mass % or less, and 2 mass % or more and 17 mass % or less, respectively. By adjusting the content of the electroconductive agent to 3 mass % or more, it is possible to exert the aforementioned effect. By adjusting the content of the electroconductive agent to 18 mass % or less, it is possible to reduce the decomposition of the nonaqueous electrolyte on the surface of the electroconductive agent under high-temperature preservation. By adjusting the content of the binder to 2 mass % or more, it is possible to obtain the sufficient strength of the positive electrode. By adjusting the content of the binder to 17 mass % or less, it is possible to reduce the content of the binder which is an insulating material in the positive electrode, which results in the decrease in internal resistance.

The positive electrode terminal 5 is a metal ribbon, a metal plate or a metal rod which is electrically connected to the positive electrode 1. The positive terminal 5 is connected to the positive electrode 1, and electrically bridges the outside of the battery and the positive electrode 1. As shown in FIG. 1A and FIG. 1B, the positive electrode current collector 1b can be welded to the metal ribbon, and this metal ribbon can be withdrawn to the outside of the exterior material, to thereby form the positive electrode terminal. For the positive electrode terminal 5, it is possible to use aluminum or titanium, etc.

The negative electrode 2 includes the negative electrode active material described above, and also can include the electroconductive agent and the binder, etc. The negative electrode active material layer 2a formed by mixing the negative electrode active material, the electroconductive agent and the binder is formed on one surface or both surfaces of the negative electrode current collector 2b. As the negative electrode active material layer 2a, it is possible to exemplify pellet-shaped, thin plate-shaped and sheet-shaped layers.

For the electroconductive agent of the negative electrode 2, it is possible to use electroconductive material such as carbon or a metal. It is preferable to use a form such as a powder or a fibrous powder. Examples of the electroconductive agent include an agent containing acetylene black, carbon black, artificial graphite, natural graphite, or an electroconductive polymer. More preferable examples include the coke, graphite and acetylene black which have been subjected to the thermal treatment at 800° C. to 2000° C. and have an average particle diameter of 10 µm; and metal powders such as TiO, TiC, TiN, Al, Ni, Cu and Fe.

As the binder, it is possible to use polytetrafluoroethylene (PTFE), polyvinylidene fluoride (PVdF), styrene-butadiene rubber and carboxymethyl cellulose (CMC), etc. Also, as the negative electrode current collector 2b, it is possible to use metal foils, thin plates, meshes and wire meshes, etc. of copper, stainless steel and nickel, etc.

As a form of the negative electrode 2, the pellet-shaped or sheet-shaped negative electrode is exemplified. In order to prepare these forms, the binder is added in the negative electrode active material and the conductive agent, and the mixture is kneaded and rolled to thereby form a pellet or sheet. Also, as another form of the negative electrode, the following negative electrode is exemplified. First, the negative electrode active material, the electroconductive agent and the binder are suspended in a solvent such as water or N-methylpyrrolidone, to thereby form the slurry. Then, this slurry is applied onto the negative electrode current collector 2b, and dried to thereby produce the negative electrode having the sheet-shaped negative electrode active material layer 2a.

Regarding the content ratios of the negative electrode active material, the electroconductive agent, and the binding agent in the negative electrode, the negative electrode active material is contained preferably within a range of 80 to 95 mass %, the electroconductive agent is contained preferably within a range of 1 to 18 mass %, and the binding agent is contained preferably within a range of 2 to 7 mass %.

As the negative electrode current collector 2b, it is possible to use metal foils, meshes and wire meshes of aluminum, stainless steel, titanium and copper, etc. which are electrochemically stable.

The negative electrode terminal 6 is a metal ribbon, a metal plate or a metal rod which is electrically connected to the negative electrode 2. The negative terminal is connected to the negative electrode 2, and electrically bridges the outside of the battery and the negative electrode 2. As shown in FIG. 1A and FIG. 1B, the negative electrode current collector 2b can be welded to the metal ribbon, and this metal ribbon can be withdrawn to the outside of the exterior material, to thereby form the negative electrode terminal. For the negative electrode terminal 6, it is possible to use aluminum, copper or stainless steel, etc. Of these, aluminum is particularly preferable because aluminum is excellent in light weight and welding connectivity.

The separator 3 is sandwiched between the positive electrode 1 and the negative electrode 2, to thereby prevent the positive electrode 1 and the negative electrode 2 from being short-circuited. As the separator 3, it is possible to use a polyolefin porous film, a cellulose nonwoven fabric, a polyethylene terephthalate nonwoven fabric and a polyolefin nonwoven fabric. Because it is possible to prevent the contamination by impurities such as water or alcohol type, a polyolefin porous film and a polyolefin nonwoven fabric are preferable. Also, a polyolefin porous film and a polyolefin nonwoven fabric are produced from polyethylene or polypropylene, and can cut off a current when being melted at a certain temperature. For this reason, safety can be improved. In addition, a nonwoven fabric is preferable because of the excellent impregnation property for a highly viscous sulfone-based compound. Although having the advantage of low cost, a cellulose nonwoven fabric has a high hygroscopic property, and it is easy to bring water in the battery as an impurity. For this reason, it is preferable to use water removal by vacuum drying when using a cellulose nonwoven fabric. It is possible to use a separator obtained by laminating different kinds of films and a separator having a short circuit-preventing function and an impregnation property-improving function which is obtained by forming a layer of a non-conductive material on the aforementioned separator.

As described above, the nonaqueous electrolyte solution is a solution obtained by dissolving the lithium salt in the mixed solvent comprised of the sulfone-based compound represented by the aforementioned formula 3 and the partially fluorinated ether represented by the aforementioned formula 4. As the sulfone-based compound, it is possible to use an asymmetric sulfone-based compound and a symmetric sulfone-based compound. There is no limitation to one kind, and it is possible to use two kinds in combination.

Also, as the lithium salt, it is preferable to use $LiPF_6$ and $LiBF_4$ are preferable, and the mixture of these can be used because it is possible to obtain good cycle performance. In addition to these lithium salts, it is possible to use lithium salts such as lithium perchlorate ($LiClO_4$), lithium trifluoromethylsulfonate, bis-trifluoromethyl sulfonyl imide lithium (LiTFSI), bis-pentafluoroethyl sulfonyl imide lithium.

As the exterior material used to form the exterior container 4, it is possible to use metal or plastic cans, or a laminate exterior material.

As a metal can, it is possible to use a rectangular container formed of a metal such as aluminum, an aluminum alloy, iron or stainless steel. It is preferable that a metal can be formed of aluminum or an aluminum alloy. It is preferable that an aluminum alloy be an alloy containing an element such as magnesium, zinc or silicon. When a transition metal such as iron, copper, nickel or chromium is contained in an aluminum alloy, it is preferable that the content of a transition metal be set to 100 ppm by mass or less.

As a laminate exterior material, it is possible to use a multi-layer film in which a metal layer is placed between resin films. In order to reduce a weight, it is preferable that a metal layer be an aluminum foil or an aluminum alloy foil. As a resin film, it is possible to use a polymer material such as polypropylene (PP), polyethylene (PE), nylon or polyethylene terephthalate (PET). A laminate exterior material can be molded into a shape of an exterior member through the sealing using thermal fusion. A laminate exterior material is preferable particularly because an internal gas generation is detectable as a change in battery appearance.

A thickness of a metal can is preferably 1.0 mm or less, and more preferably 0.5 mm or less. Also, a thickness of a laminate exterior material is preferably 0.5 mm or less.

Examples of the shape of the exterior container 4 include a flat type (thin type), a square type, a cylindrical type, a coin type and a button type. Specific examples of the exterior container 4 include an exterior member for a small battery which is mounted on a portable electronic device, etc. and an exterior member for a large battery which is mounted on a two-wheel or four-wheel automobile, etc.

As described above, the nonaqueous electrolyte solution secondary battery of the present embodiment includes the nonaqueous electrolyte solution containing the sulfone-based compound, the partially fluorinated ether and the lithium salt; the positive electrode containing $L_{1-x}Mn_{1.5-y}Ni_{0.5-z}M_{y+z}O_4$ as a positive electrode active material; and the negative electrode containing the Ti-containing oxide capable of inserting and extracting lithium as a negative electrode active material; the separator; and the exterior material. Therefore, it is possible to suppress the reaction between the nonaqueous electrolyte solution and the positive electrode, and to realize the high cycle performance.

Second Embodiment

Next, the nonaqueous electrolyte solution secondary battery according to the 2nd embodiment will be described.

The nonaqueous electrolyte solution secondary battery according to the present embodiment includes at least a positive electrode, a negative electrode and a nonaqueous electrolyte solution. More specifically, the nonaqueous electrolyte solution secondary battery according to the present embodiment includes an external material; a positive electrode that is accommodated inside the external material; a negative electrode that is spatially separated from the positive electrode inside the external material, and is accommodated with, for example, a separator interposed therebetween; and a nonaqueous electrolyte solution with which the inside of the external material is filled.

Figure 2:
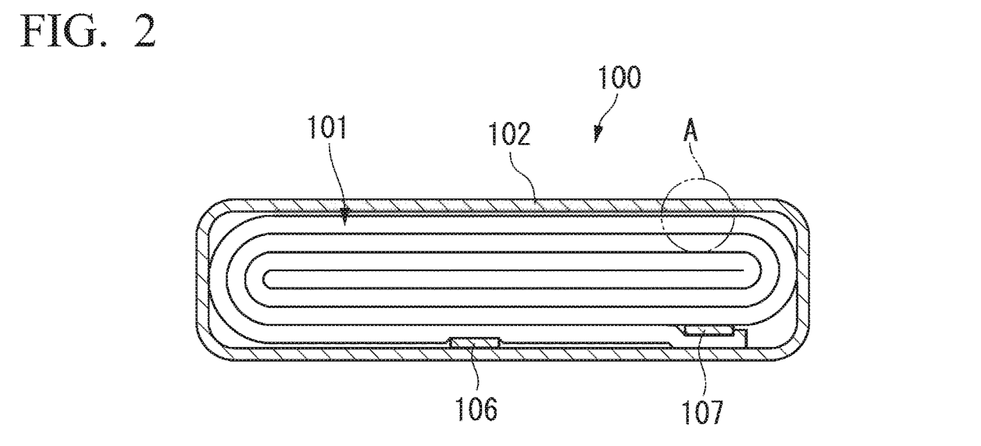
FIG. 2 is a schematic cross-sectional view showing an example of the nonaqueous electrolyte solution secondary battery of the 2nd embodiment.
Figure 3:
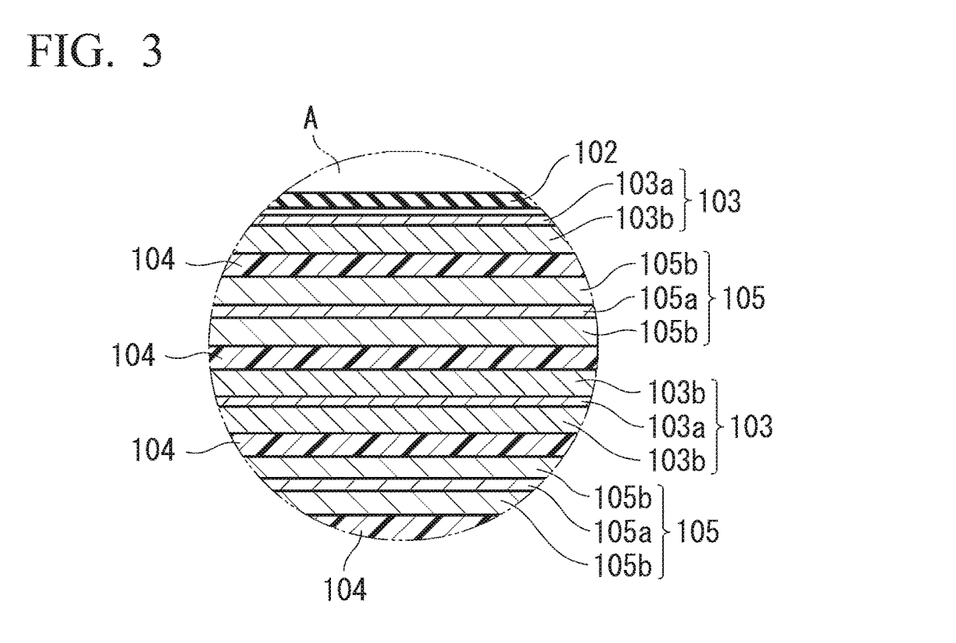
FIG. 3 is an enlarged schematic cross-sectional view of the A part of FIG. 2.

Hereinafter, the nonaqueous electrolyte solution secondary battery 100 illustrated in FIG. 2 and FIG. 3 will be described as an example of the nonaqueous electrolyte solution secondary battery according to the present embodiment. FIG. 2 is a schematic sectional view illustrating the cross-section of the nonaqueous electrolyte solution secondary battery 100. FIG. 3 is an enlarged sectional view illustrating a part A illustrated in FIG. 2. These drawings are schematic diagrams for describing the nonaqueous electrolyte solution secondary battery according to the present embodiment. The shapes, dimensions, ratios, and the like are different from those of actual device in some portions, but design of the shape, dimensions, ratios, and the like can be appropriately modified in consideration of the following description and known technologies.

The nonaqueous electrolyte solution secondary battery 100 illustrated in FIG. 2 is configured such that the winding electrode group 101 with a flat shape is accommodated inside the exterior material 102. The exterior material 102 may be made by forming a laminated film in a bag-like shape or may be a metal container. The winding electrode group 101 with the flat shape is formed by spirally winding a laminate laminated from the outside, i.e., the side of the exterior material 102, in the order of the negative electrode 103, the separator 104, the positive electrode 105, and the separator 104; and performing press-molding. As illustrated in FIG. 2, the negative electrode 103 located at the outermost periphery may have the configuration in which a negative electrode layer 103b is formed on only one side of the inner surface of a negative electrode collector 103a. The negative electrodes 103 of portions other than the outermost periphery have the configuration in which the negative electrode layers 103b are formed on both surfaces of the negative electrode collector 103a. In the nonaqueous electrolyte solution secondary battery 100 according to the present embodiment, the positive electrode active material, the negative electrode active material and the nonaqueous electrolyte described above were used as a positive electrode active material, a negative electrode active material and a nonaqueous electrolyte.

In the winding electrode group 101 illustrated in FIG. 2, in the vicinity of the outer peripheral end thereof, a negative electrode terminal 106 is electrically connected to the negative electrode collector 103a of the negative electrode 103 of the outermost periphery. The positive electrode terminal 107 is electrically connected to the positive electrode collector 105a of the inside positive electrode 105, as illustrated in FIG. 3. The negative electrode terminal 106 and the positive electrode terminal 107 extend toward the outer portion of the exterior material 102 with the bag-like shape or are connected to extraction electrodes included in the exterior material 102. By connecting a plurality of the negative electrode terminals 106 and the positive electrode terminals 107, it is possible to reduce the electrical resistance. In this case, it is desirable to uniformly arrange the negative electrode terminals and the positive electrode terminals in a plurality of positions of the positive and negative electrodes in addition to the positions described above.

When manufacturing the nonaqueous electrolyte solution secondary battery 100 including an exterior material formed of a laminated film, the exterior material 102 with the bag-like shape having an opening is charged with the winding electrode group 101 to which the negative electrode terminal 106 and the positive electrode terminal 107 are connected. Then, the liquid nonaqueous electrolyte solution is injected from the opening of the exterior material 102, and the opening of the exterior material 102 with the bag-like shape is subjected to heat-sealing, to thereby completely seal the winding electrode group 1 and the liquid nonaqueous electrolyte solution.

Also, when manufacturing the nonaqueous electrolyte solution secondary battery 100 having an exterior material formed of a metal container, the metal container having an opening is charged with the winding electrode group 101 to which the negative electrode terminal 106 and the positive electrode terminal 107 are connected. Then, the nonaqueous electrolyte solution is injected from the opening of the exterior material 102, and the opening is sealed by mounting a cover member on the metal container.

As the exterior material 102, the positive electrode 105, the negative electrode 103, the separator 104, the negative electrode terminal 106 and the positive electrode terminal 107, it is possible to use the same components as the positive electrode, the negative electrode, separator, negative electrode terminal and the positive electrode terminal described in the 1st embodiment.

Figure 4:
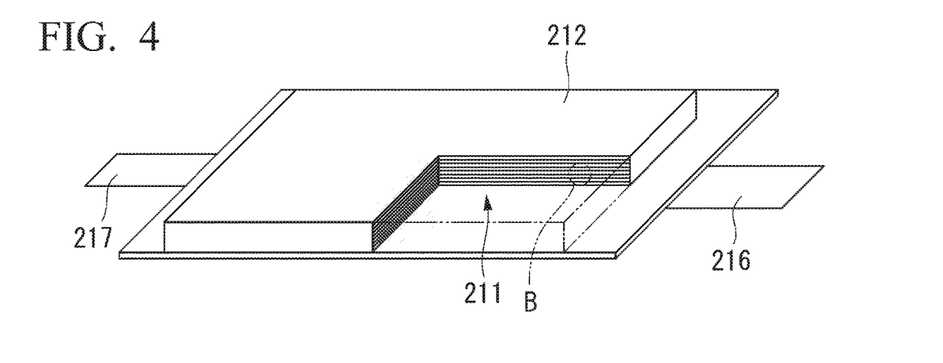
FIG. 4 is a partial cutaway perspective view showing another example of the nonaqueous electrolyte solution secondary battery of the 2nd embodiment.
Figure 5:
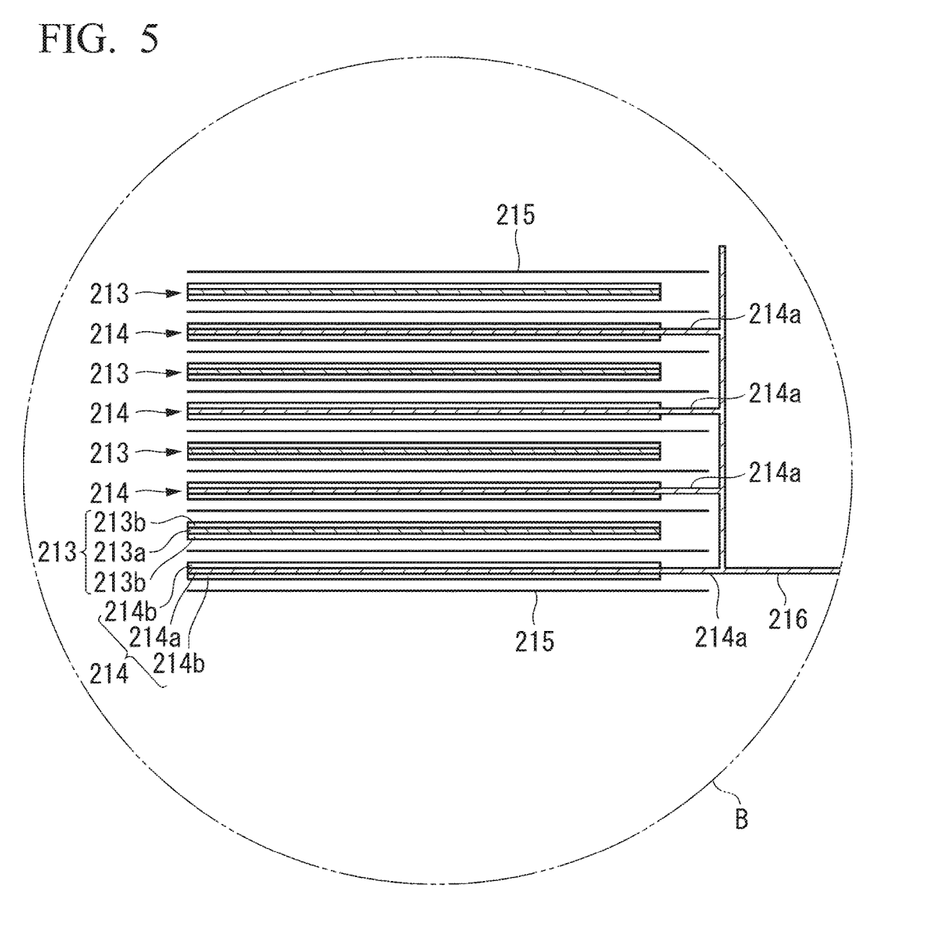
FIG. 5 is an enlarged schematic cross-sectional view of the B part of FIG. 4.

The configuration of the nonaqueous electrolyte solution secondary battery according to the 2nd embodiment is not limited to the above-described configuration illustrated in FIG. 2 and FIG. 3. For example, a battery having a configuration illustrated in FIG. 4 and FIG. 5 may be used. FIG. 4 is a partial cutout perspective view schematically illustrating another nonaqueous electrolyte solution secondary battery according to the 2nd embodiment. FIG. 5 is an enlarged schematic sectional view illustrating a part B of FIG. 4.

The nonaqueous electrolyte solution secondary battery illustrated in FIG. 4 and FIG. 5 is configured such that a lamination type electrode group 211 is accommodated inside an exterior member 212. As illustrated in FIG. 5, the lamination type electrode group 211 has a structure in which positive electrodes 213 and negative electrodes 214 are alternately laminated with separators 215 interposed therebetween.

As illustrated in FIG. 5, the plurality of positive electrodes 213 is present and each include a positive electrode collector 213a and positive electrode layers 213b supported on both surfaces of the positive electrode collector 213a. The positive electrode layer 213b contains a positive electrode active material.

As illustrated in FIG. 5, as in the positive electrodes 213, the plurality of negative electrodes 214 is present and each includes a negative electrode collector 214a and negative electrode layers 214b supported on both surfaces of the negative electrode collector 214a. The negative electrode layer 214b contains the negative electrode active material. One side of the negative electrode collector 214a of each negative electrode 214 protrudes from the negative electrode 214. The protruding negative electrode collector 214a is electrically connected to a strip-shaped negative electrode terminal 216. The front end of the strip-shaped negative electrode terminal 216 is drawn from the exterior member 212 to the outside. Although not illustrated, the side of the positive electrode collector 213a of the positive electrode 213 located opposite to the protruding side of the negative electrode collector 214a protrudes from the positive electrode 213. The positive electrode collector 213a protruding from the positive electrode 213 is electrically connected to a strip-shaped positive electrode terminal 217. The front end of the strip-shaped positive electrode terminal 217 is located on an opposite side to the negative electrode terminal 216 and is drawn from a side of the exterior member 212 to the outside.

The material, a mixture ratio, dimensions, and the like of each member included in the nonaqueous electrolyte solution secondary battery illustrated in FIG. 4 and FIG. 5 are configured to be the same as those of each constituent member of the nonaqueous electrolyte solution secondary battery 100 described in FIG. 2 and FIG. 3.

As described above, the present embodiment includes the nonaqueous electrolyte solution containing the sulfone-based compound, the partially fluorinated ether and the lithium salt; the positive electrode containing $L_{1-x}Mn_{1.5-y}Ni_{0.5-z}M_{y+z}O_4$ as a positive electrode active material; and the negative electrode containing the Ti-containing oxide capable of inserting and extracting lithium as a negative electrode active material; the separator; and the exterior material. Therefore, it is possible to suppress the reaction between the nonaqueous electrolyte solution and the positive electrode, and to realize the high cycle performance.

Third Embodiment

Next, a battery pack according to the 3rd embodiment will be described in detail.

The battery pack according to the present embodiment includes at least one of the nonaqueous electrolyte solution secondary batteries (that is, single batteries) according to the aforementioned 2nd embodiment. When the plurality of single batteries is included in the battery pack, the single batteries are electrically connected in series, in parallel, or in series and parallel to be disposed.

Figure 6:
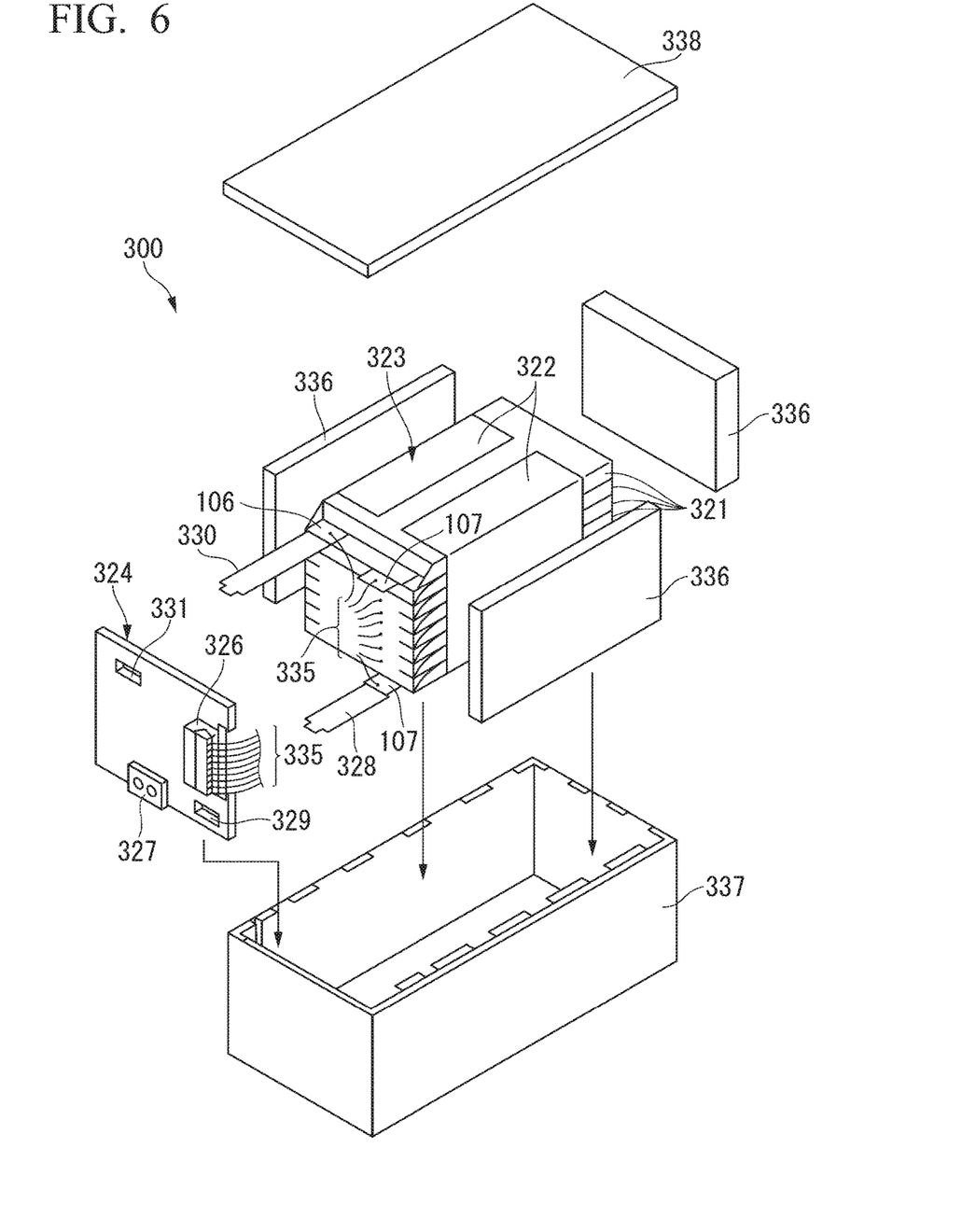
FIG. 6 is an exploded perspective view showing the battery pack of the 3rd embodiment.
Figure 7:
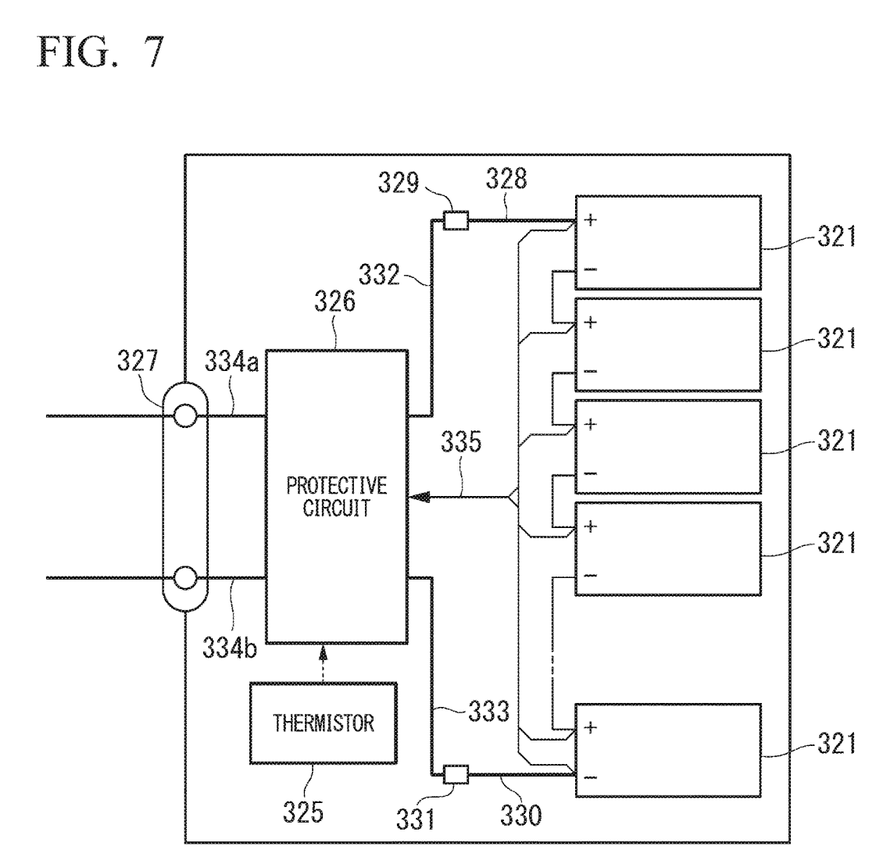
FIG. 7 is a block diagram showing the electric circuit provided in the battery pack of FIG. 6.

Referring to FIG. 6 and FIG. 7, a battery pack 300 according to the present embodiment will be described specifically. In the battery pack 300 illustrated in FIG. 6, the nonaqueous electrolyte solution secondary battery 100 illustrated in FIG. 2 is used as a single battery 321.

The plurality of single batteries 321 is laminated so that the negative electrode terminals 106 and the positive electrode terminals 107 extending to the outside are arranged in the same direction, and thus assembled batteries 323 are configured by fastening using an adhesive tape 322. The single batteries 321 are mutually connected electrically in series, as illustrated in FIG. 6 and FIG. 7.

A printed wiring board 324 is disposed to face the side surfaces of the single batteries 321 in which the negative electrode terminals 106 and the positive electrode terminals 107 extend. As illustrated in FIG. 6, a thermistor 325 (see FIG. 7), a protective circuit 326, and an electrifying terminal 327 to an external device are mounted on the printed wiring board 324. An insulation plate (not illustrated) is mounted on the surface of the printed wiring board 324 facing the assembled batteries 323 in order to avoid unnecessary connection with wirings of the assembled batteries 323.

A positive-side lead 328 is connected to the positive electrode terminal 107 located in the lowermost layer of the assembled batteries 323 and the front end of the positive electrode-side lead is inserted into a positive electrode-side connector 329 of the printed wiring board 324 to be electrically connected. A negative electrode-side lead 330 is connected to the negative electrode terminal 106 located in the uppermost layer of the assembled batteries 323 and the front end of the negative electrode-side lead is inserted into a negative electrode-side connector 331 of the printed wiring board 324 to be electrically connected. These connectors 329 and 331 are connected to the protective circuit 326 via wirings 332 and 333 (see FIG. 7) formed in the printed wiring board 324.

The thermistor 325 is used to detect a temperature of the single battery 321. Although not illustrated in FIG. 6, the thermistor is installed near the single batteries 321, and a detection signal is transmitted to the protective circuit 326. The protective circuit 326 blocks a plus-side wiring 334a and a minus-side wiring 334b between the protective circuit 326 and the electrifying terminal 327 connected to an external device under a predetermined condition. Herein, for example, the predetermined condition is that the detection temperature of the thermistor 325 be equal to or greater than a predetermined temperature. The predetermined condition is also that an overcharge, overdischarge, overcurrent, or the like of the single battery 321 be detected. The detection of the overcharge or the like is performed for the individual single batteries 321 or all of the single batteries 321. When the overcharge or the like is detected in the individual single batteries 321, a battery voltage may be detected, or a positive electrode potential or a negative electrode potential may be detected. In the latter case, lithium electrodes used as reference poles are inserted into the individual single batteries 321. In the case of FIG. 6 and FIG. 7, wirings 335 are connected to detect the respective voltages of the single batteries 321 and detection signals are transmitted to the protective circuit 326 via the wirings 335.

As illustrated in FIG. 6, protective sheets 336 formed of rubber or resin are disposed on three side surfaces of the assembled batteries 323 excluding the side surface from which the positive electrode terminals 107 and the negative electrode terminals 106 protrude.

The assembled batteries 323 are accommodated along with the protective sheets 336 and the printed wiring board 324 inside an accommodation container 337. That is, the protective sheets 336 are disposed on both of the inner surfaces of the accommodation container 337 in the longer side direction and the inner surface in the shorter side direction, and the printed wiring board 324 is disposed on the inner surface opposite to the protective sheet 336 in the shorter side direction. The assembled batteries 323 are located in a space surrounded by the protective sheets 336 and the printed wiring board 324. A cover 338 is mounted on the upper surface of the accommodation container 337.

When the assembled batteries 323 are fixed, a thermal shrinkage tape may be used instead of the adhesive tape 322. In this case, protective sheets are disposed on both side surfaces of the assembled batteries, the thermal shrinkage tape is circled, and then the thermal shrinkage tape is subjected to thermal shrink age, so that the assembled batteries are fastened.

Here, in FIG. 6 and FIG. 7, the single batteries 321 connected in series are illustrated. However, to increase a battery capacity, the single batteries 321 may be connected in parallel or may be connected in a combination form of series connection and parallel connection. The assembled battery packs can also be connected in series or in parallel.

As described above, the present embodiment includes the single battery 321 which includes the nonaqueous electrolyte solution containing the sulfone-based compound, the partially fluorinated ether and the lithium salt; the positive electrode containing $L_{1-x}Mn_{1.5-y}Ni_{0.5-z}M_{y+z}O_4$ as a positive electrode active material; and the negative electrode containing the Ti-containing oxide capable of inserting and extracting lithium as a negative electrode active material; the separator; and the exterior material. Therefore, it is possible to suppress the reaction between the nonaqueous electrolyte solution and the positive electrode in the single battery 321, and to improve the cycle performance.

The form of the battery pack can be appropriately modified according to a use application. It is preferable that the use application of the battery pack according to the present embodiment be one which is required to show excellent cycle performance when a large current is extracted. Specifically, the battery pack can be used for power of digital cameras, a two-wheeled or four-wheeled hybrid electric vehicle, a two-wheeled or four-wheeled electric vehicle, an assist bicycle, and the like. In particular, the battery pack using the nonaqueous electrolyte solution secondary batteries with excellent high temperature characteristics is appropriately used for vehicles.

As described above, the present embodiment includes the nonaqueous electrolyte solution having the sulfone-based compound and the partially fluorinated ether, and therefore, it is possible to realize the high cycle performance.

EXAMPLES

Hereinafter, the examples of the present embodiment are described with reference to the drawings. In the following examples, the battery structure shown in FIG. 1A and FIG. 1B was used.

Example 1

The $LiMn_{1.5}Ni_{0.5}O_4$ powder 90 wt % which was the positive electrode active material, acetylene black 2 wt %, graphite 5 wt %, and polyvinylidene fluoride 5 wt % which was the binder were dissolved in N-methylpyrrolidone, to thereby prepare the slurry. The slurry was applied onto the both sides of the aluminum foil having a thickness of 15 μm, and dried and rolled to thereby form the positive electrode sheet having a width of 67 mm and a length of 92 mm. The 5-mm parts at the longitudinal ends of the respective positive electrode sheets were treated as the uncoated parts, and the respective parts were welded to the aluminum ribbons having a width of 5 mm and a thickness of 0.1 mm at 3 positions, to thereby form the positive electrode tabs.

The $LiMn_4Ti_5O_{12}$ powder 90 wt % which was the negative electrode active material, artificial graphite 5 wt % which was the conductive material, and polyvinylidene fluoride (PVdF) 5 wt % were dissolved in N-methylpyrrolidone (NMP), to thereby prepare the slurry. The slurry was applied onto the both sides of the aluminum foil having a thickness of 25 μm, and dried and then rolled to thereby form the negative electrode sheet. The obtained negative electrode sheet was cut out so as to have the size of a width of 68 mm and a length of 93 mm. The 5-mm parts at the ends of the cut negative electrode sheet were treated as the uncoated parts, and the respective parts were welded to the aluminum ribbons having a width of 5 mm and a thickness of 0.1 mm at 3 positions, to thereby form the negative electrode tabs.

The porous polyethylene film having a width 93 mm (one type of porous polyolefin films) was used as the separator.

The belt-shaped positive electrode sheet, the separator, the belt-shaped negative electrode sheet and the separator were respectively laminated for 10 times in this order, to thereby form the electrode coil. The positive electrode tab was overlapped and welded to the aluminum sheet having a thickness of 0.1 mm, a width of 30 mm and a length of 50 mm, to thereby form the positive electrode terminal 5. In the same manner, the negative electrode tab was overlapped and welded to the aluminum sheet having a thickness of 0.1 mm, a width of 30 mm and a length of 50 mm, to thereby form the negative electrode terminal 6.

The electrode group was housed in the aluminum laminate exterior material. Ethyl isopropyl sulfone (abbreviation: EIPS) which is an asymmetric sulfone-based compound (abbreviation: EIPS) was distilled under reduced pressure, and then was used. As the partially fluorinated ether, 1,1,1,2,3,3-hexafluoro-4-(1,1,2,3,3,3-hexafluoropropoxy)-pentane (abbreviation: HFE) was used. The F/H ratio of the HFE was 2.0. The EIPS and the HFE were mixed at the volume ratio of 3:1, and the lithium salt ($LiBF_4$) was dissolved therein so as to prepare the 0.9 M solution. This nonaqueous electrolyte solution 9 g was added in the aluminum laminate exterior material that housed the electrode group, and the aluminum laminate exterior material was closed by heat-sealing, to thereby produce the nonaqueous electrolyte solution secondary battery.

Example 2

The nonaqueous electrolyte solution secondary battery was produced in the same manner as in Example 1 except for mixing the EIPS and the HFE at the volume ratio of 95:5.

Example 3 (Reference Example)

The nonaqueous electrolyte solution secondary battery was produced in the same manner as in Example 1 except for mixing the ethyl methyl sulfone ($R_1$=a methyl group and $R_2$=an ethyl group) and the HFE at the volume ratio of 3:1. The evaluation was carried out at 45° C. because the melting point was high.

Example 4

The nonaqueous electrolyte solution secondary battery was produced in the same manner as in Example 1 except for mixing the isopropyl methyl sulfone ($R_1$=a methyl group and $R_2$=an isopropyl group) and the HFE at the volume ratio of 3:1.

Example 5 (Reference Example)

The nonaqueous electrolyte solution secondary battery was produced in the same manner as in Example 1 except for mixing the n-butyl methyl sulfone ($R_1$=a methyl group and $R_2$=an n-butyl group) and the RFE at the volume ratio of 3:1.

Example 6 (Reference Example)

The nonaqueous electrolyte solution secondary battery was produced in the same manner as in Example 1 except for mixing the n-butyl sulfone ($R_1$=an n-butyl group and $R_2$=an n-butyl group) and the HFE at the volume ratio of 3:1. The evaluation was carried out at 45° C. because the melting point was high.

Example 7

The nonaqueous electrolyte solution secondary battery was produced in the same manner as in Example 1 except for mixing the EIPS and the partially fluorinated ether $C_9H_{10}F_{10}O$ at the volume ratio of 3:1.

Example 8

The nonaqueous electrolyte solution secondary battery was produced in the same manner as in Example 1 except for mixing the EIPS and the partially fluorinated ether $C_7H_4F_{12}O$ at the volume ratio of 3:1.

Example 9

The nonaqueous electrolyte solution secondary battery was produced in the same manner as in Example 1 except for using $LiMn_{1.45}Mg_{0.05}Ni_{0.5}O_4$ (x=0, y=0.05, Z=0) as the positive electrode active material.

Comparative Example 1

The nonaqueous electrolyte solution secondary battery was produced in the same manner as in Example 1 except for using only the EIPS.

The obtained nonaqueous electrolyte solution secondary batteries of Examples 1-9 and Comparative Example 1 were charged for 10 hours at a constant current of 0.3 A and a constant voltage of 3.25 V, and then were discharged at a current of 0.3 A such that the voltage decreased to 2.7 V.

Thereafter, the charge at a constant current of 0.75 A and a constant voltage of 3.25 V, and the discharge at a current of 0.75 A until decreasing to 2.7 V were repeated for 99 times. Subsequently, the charge at a constant current of 0.3 A and a constant voltage of 3.25 V, and the discharge at a current of 0.3 A until decreasing to 2.7 V were carried out. In Example 1 and Comparative Example 1, the aforementioned process was further repeated for 6 times.

Figure 8:
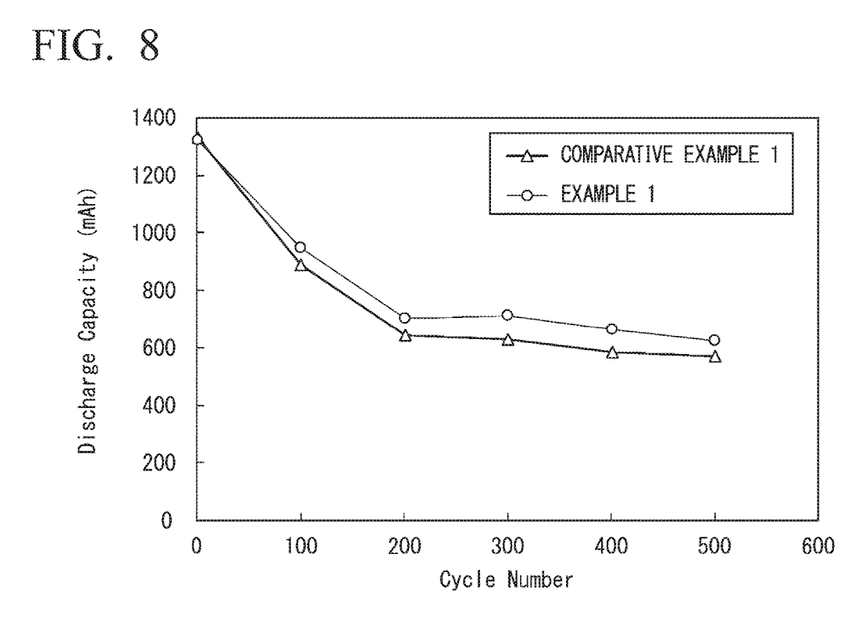
FIG. 8 is the graph showing the relationship between the cycle number and the discharge capacity in Example 1 and Comparative Example 1.
Figure 9:
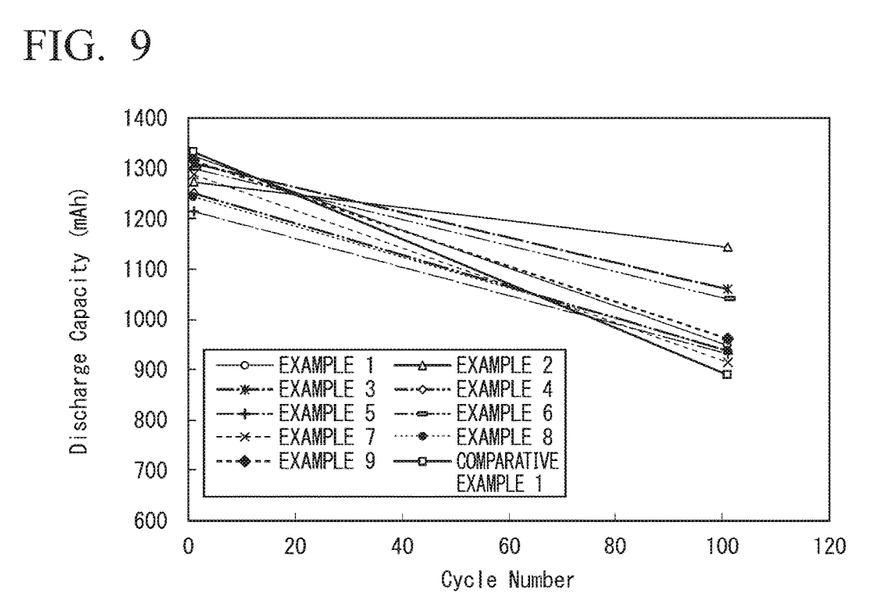
FIG. 9 is the graph showing the relationship between the cycle number and the discharge capacity in Examples 1 to 9 and Comparative Example 1.

FIG. 8 is the graph showing the relationship between the cycle number and the discharge capacity in Example 1 and Comparative Example 1. FIG. 9 is the graph showing the relationship between the cycle number and the discharge capacity in Examples 1 to 9 and Comparative Example 1. Also, FIG. 10 is the graph showing the relationship between the cycle number and the discharge capacity holding ratio in Examples 1 to 9 and Comparative Example 1.

From the results described above, as shown in FIG. 8 to FIG. 10, Examples 1-9 (Examples 3, 5 and 6 are Reference Examples) showed the larger capacities after repeating the cycles than Comparative Example 1. Also, when comparing the cell thickness after 600 cycles, Example 1 showed the 24% smaller thickness than Comparative Example 1, and the significant difference in the amount of gas generation was observed.

Figure 10:
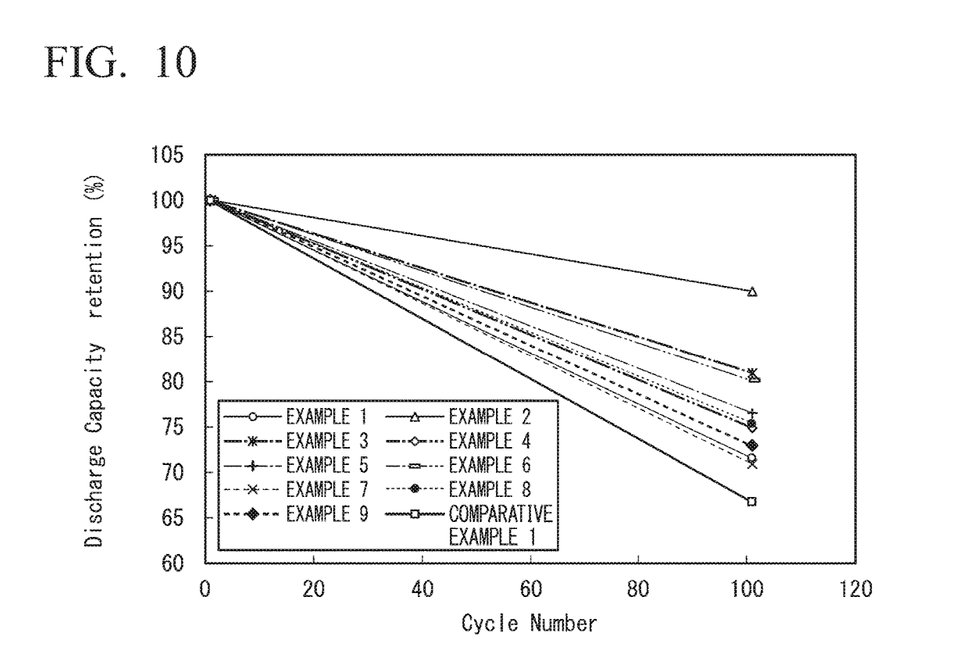
FIG. 10 is the graph showing the relationship between the cycle number and the discharge capacity holding ratio in Examples 1 to 9 and Comparative Example 1.

Also, as shown in FIG. 9 and FIG. 10, Examples 1-9 showed the larger capacities after repeating the cycles than Comparative Example 1 and the higher capacity holding ratios compared with the capacity before the start of the cycle than Comparative Example 1.

As described above, it was found that the cycle performance of the nonaqueous electrolyte solution secondary battery was improved by mixing partially fluorinated ether in Examples 1 to 9.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A nonaqueous electrolyte solution secondary battery, comprising:
an exterior material;
a nonaqueous electrolyte solution which is charged in the exterior material and comprises a sulfone-based compound represented by formula 1, a partially fluorinated ether represented by formula 2, and a lithium salt:

FORMULA 1

FORMULA 2

$C_xH_{2x+2-y}F_yO$;

a positive electrode which is housed in the exterior material and comprises a composite oxide represented by $Li_{1-x}Mn_{1.5-y}Ni_{0.5-z}M_{y+z}O_4$ as a positive electrode active material, wherein $0 \le x \le 1$, $0 \le (y+z) \le 0.15$, and M represents at least one selected from the group consisting of Mg, Al, Ti, Fe, Co, Ni, Cu, Zn, Ga, Nb, Sn, Zr and Ta;

a negative electrode which is housed in the exterior material and comprises a Ti-containing oxide capable of inserting and extracting lithium as a negative electrode active material; and a separator sandwiched between the positive electrode and the negative electrode, wherein:

$R_1$ represents a methyl group or an ethyl group;

$R_2$ represents an isopropyl group; and x and y represent an integer of x>6 and y>3.

2. The nonaqueous electrolyte solution secondary battery according to claim 1, wherein:

the nonaqueous electrolyte solution comprises the partially fluorinated ether represented by formula 2; and a ratio (F/H) of a fluorine atom number (F) and a hydrogen atom number (H) of the partially fluorinated ether represented by formula (2) is 1.0 or more and 3.0 or less.

3. The nonaqueous electrolyte solution secondary battery according to claim 1, wherein:

the nonaqueous electrolyte solution comprises the partially fluorinated ether represented by formula 2; and a carbon atom number of the partially fluorinated ether is 8 or more and 12 or less.

4. The nonaqueous electrolyte solution secondary battery according to claim 1, wherein the lithium salt is $LiPF_6$, $LiBF_4$, or a mixture thereof.

5. The nonaqueous electrolyte solution secondary battery according to claim 1, wherein the fluorine atoms in the molecule of the partially fluorinated ether is distributed on both sides of an ether bond.

6. The nonaqueous electrolyte solution secondary battery according to claim 1, wherein the concentration of the lithium salt in the nonaqueous electrolyte solution is from 0.5 mol/L to 2.5 mol/L.

7. The nonaqueous electrolyte solution secondary battery according to claim 1, wherein the negative electrode active material is at least one selected from the group consisting of spinel type lithium titanate, monoclinic titanium dioxide, monoclinic niobium-titanium composite oxide and iron sulfide.

8. The nonaqueous electrolyte solution secondary battery according to claim 1, wherein the negative electrode active material is at least one selected from the group consisting of:

a spinel-structure lithium titanium oxide represented by $Li_{4/3+x}Ti_{5/3}O_4$, wherein $0 \le x \le 1$;

a bronze-structure (B) or anatase-structure titanium oxide represented by $Li_xTiO_2$, wherein $0 \le x \le 1$;

a niobium titanium oxide represented by $Li_xNb_aTiO_7$, wherein $0 \le x$; and a lithium titanium oxide selected from ramsdellite-structure $Li_{2+x}Ti_3O_7$, $Li_{1+x}Ti_2O_4$, $Li_{1.1+x}Ti_{1.8}O_4$ and $Li_{1.07+x}Ti_{1.86}O_4$, wherein $0 \le x \le 1$.

9. The nonaqueous electrolyte solution secondary battery according to claim 1, wherein the positive electrode comprises the positive electrode active material, the electroconductive agent, and a binder.

10. The nonaqueous electrolyte solution secondary battery according to claim 1, wherein the positive electrode comprises a positive electrode active material layer formed on the positive electrode current collector.

11. The nonaqueous electrolyte solution secondary battery according to claim 10, wherein the positive electrode active material layer comprises the positive electrode active material at a ratio of 80 to 95 mass %, the electroconductive agent at a ratio of 3 to 18 mass %, and a binder at a ratio of 2 to 17 mass %.

12. The nonaqueous electrolyte solution secondary battery according to claim 1, wherein x represents an integer of 6<x<12.

13. The nonaqueous electrolyte solution secondary battery according to claim 1, wherein x represents an integer of 7, 8 or 9.

14. A battery pack, comprising the nonaqueous electrolyte solution secondary battery according to claim 1.

15. The battery pack according to claim 14, further comprising an electrifying terminal and a protective circuit.

16. The battery pack according to claim 14, comprising a plurality of the nonaqueous electrolyte batteries, wherein the nonaqueous electrolyte batteries are connected in series, in parallel or with a combination of series connection and parallel connection.

* * * * *